May 5, 1959

J. M. CLUWEN 2,885,575

LIMITING CIRCUIT

Filed Dec. 31, 1956

INVENTOR
JOHANNES MEYER CLUWEN

BY Frank R. Trifari
AGENT 2,885,575

LIMITING CIRCUIT

Johannes Meyer Cluwen, Eindhoven, Netherlands, assignor, by mesne assignments, to North American Philips Company, Inc., New York, N.Y., a corporation of Delaware Application December 31, 1956, Serial No. 631,783

Claims priority, application Netherlands January 28, 1956

6 Claims. (Cl. 307—88.5)

This invention relates to circuits for limiting electrical signal oscillations by means of a transistor having an input resonance circuit. Such limiters are used, for example, in receivers for frequency-modulated oscillations. Its object is to provide a highly effective suppression of unwanted amplitude modulation of the signal oscillations and is characterized in that the input resonance circuit is connected to a dynamic limiter for the first suppression of unwanted amplitude modulation of the signal oscillations and also for producing the voltage for the collector of the transistor, which is connected as a collector limiter and, by variation of its input impedance, brings about further suppression of unwanted amplitude modulation by variable damping of the input circuit.

Figure 1:
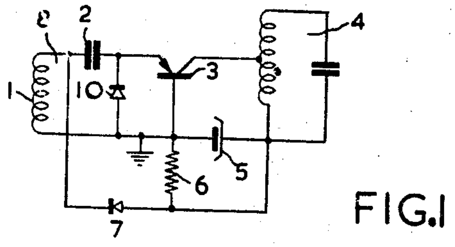
Figure 2:
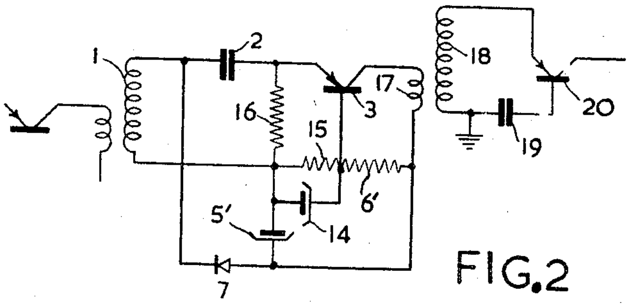
Figure 3:
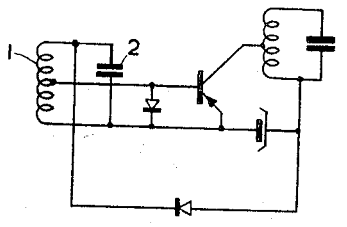

In order that the invention may be readily carried into effect, it will now be described more fully, by way of example, with reference to the accompanying drawing, in which Fig. 1 shows a skeleton diagram Fig. 2 shows a further elaborated embodiment and Fig. 3 shows a variation of Fig. 2.

In Fig. 1, the oscillations to be limited are supplied to a resonance circuit comprising an inductance 1 and a capacitor 2, which are connected in series between the emitter and the base of a junction transistor 3 operated in "common base connection." The collector circuit includes a circuit 4 across which the limited oscillations are produced. For this purpose the collector circuit also includes a capacitor 5 together with a leakage resistor 6 and a rectifier 7, which jointly constitute a dynamic limiter across the circuit 1—2.

On account of the very low input impedance of transistor 3 during its conductive period, the circuit 1—2 has a low natural damping and hence a high circuit quality. The circuit voltage at point 8 is detected by means of rectifier 7, the time-constant of the filter 5—6 being so high that the voltage produced across it cannot follow the unwanted amplitude modulation of the input oscillations and therefore it assumes a value equal to the mean signal voltage. The circuit 1—2 is thus subject to a variable damping by which the unwanted amplitude modulation is partly suppressed.

However, by suitable choice of polarity of rectifier 7, the voltage across capacitor 5 also serves as the collector supply voltage, the impedance of the circuit 4 being chosen so high that, when that instantaneous amplitude is reached, at which the limitation of the limiter 5—6—7 begins, the instantaneous value of the collector-base voltage periodically becomes substantially zero, so that the transistor is operated in collector limitation. This involves a periodic increase in the input impedance of the transistor, which in turn causes the input circuit 1—2 to be periodically damped in a sense suppressing the unwanted amplitude modulation. For this purpose the impedance of capacitor 2 must be substantially equal to that of the circuit 4 as measured between the collector and the capacitor 5.

In order to avoid damping of the circuit during the negative half wave of the signal oscillation, a rectifier 10 having an opposite direction of passage and thus being conductive for this current is connected parallel with the emitter-base path of transistor 3. However, according to Fig. 2, it is more advantageous also to utilise the dynamic limiter 5′—6′—7, by the addition of a resistor 15 preferably decoupled by a capacitor 14, for producing a small emitter forward voltage which is applied by way of a resistor 16 to the emitter. The ratio between the resistors 15 and 6′ is chosen to be substantially equal to the ratio between resistor 16 and the impedance in the collector circuit of transistor 3, which impedance may comprise a coil 17 and a further resonance circuit 18—19 coupled therewith, for controlling a subsequent transistor 20. Thus, the collector limitation begins with the same oscillation amplitude as that with which the emitter-base path of the transistor is cut off, so that in this way a further suppression of unwanted amplitude modulation is obtained.

Instead of using the circuits shown, in which the transistor 3 is operated in common base-connection and use is made of an input series-resonance circuit 1—2, it is alternatively possible to operate the transistor in common emitter connection (Fig. 3), in which event use must be made of an input parallel-resonance circuit. However, such a circuit has the disadvantage that the circuit 1—2 is usually damped more strongly, thus reducing the effectiveness of the dynamic limiter, whilst the last-mentioned possibility of suppression of unwanted amplitude modulation cannot be realised in the same simple manner.

By critical back-coupling of the inductance 1 with the circuit 4 of Fig. 1 or with the coil 17 of Fig. 2, it is possible to obtain an undamped rectifier or, if desired, an oscillator having a stabilised oscillation amplitude.

The resistor 6 of Fig. 1 may in most cases be omitted without objection.

The inductance 1 and the capacitor 2 of Fig. 1 may be interchanged, if desired.

What is claimed is:

1. A limiter circuit for limiting the amplitude of an electrical signal, comprising an input resonant circuit, means for applying said signal to said input resonant circuit, a transistor having base and emitter input electrodes and a collector output electrode, means connecting said input electrodes to points on said resonant circuit, a dynamic limiter circuit comprising a rectifier element connected to said input circuit to limit the amplitude of said signal, said dynamic limiter circuit further comprising a filter connected to said rectifier for producing a voltage in accordance with the amplitude of said signal, and means connected to apply said voltage to said collector output electrode, said rectifier being polarized with respect to said collector output electrode so that at a given value of said voltage the impedance of said input electrodes changes to cause variable damping of said input resonant circuit thereby achieving additional limiting of said signal.

2. A limiter circuit as claimed in claim 1, in which said transistor is connected in a common base configuration, and in which said input resonant circuit comprises an inductor and a capacitor connected in series between said base and emitter electrodes.

3. A limiter circuit as claimed in claim 1, in which said transistor is connected in a common emitter configuration, and in which said input resonant circuit comprises an inductor and a capacitor connected in parallel.

4. A limiter circuit as claimed in claim 1, including a rectifier connected between said emitter and base electrodes and polarized oppositely to the polarization of the emitter-base path of said transistor.

5. A limiter circuit as claimed in claim 1, including means connected to apply a portion of said voltage in the forward direction between the emitter and base electrodes of said transistor.

6. A limiter circuit as claimed in claim 5, in which said filter comprises a tapped resistor, and including means connecting said base electrode to the tap on said resistor, an input resistor connected between said emitter electrode and a first end of said tapped resistor, an output circuit connected between said collector electrode and the remaining end of said tapped resistor, and a decoupling capacitor connected between said tap and said first end of the tapped resistor, said tap being located so that the ratio of the resistance between said tap and said first end to the resistance between said tap and said remaining end is equal to the ratio of the resistance of said input resistor to the impedance of said output circuit.

References Cited in the file of this patent

UNITED STATES PATENTS

| | | |
|---|---|---|
| 2,616,967 | Beukema | Nov. 4, 1952 |
| 2,774,866 | Burger | Dec. 18, 1956 |
| 2,777,057 | Pankove | Jan. 8, 1957 |